United States Patent
Snipes

[11] 3,905,147
[45] Sept. 16, 1975

[54] FISHING LURE
[76] Inventor: Eugene A. Snipes, 1675 Pennsylvania Ave., Colton, Calif. 92324
[22] Filed: Jan. 7, 1974
[21] Appl. No.: 431,238

[52] U.S. Cl. ............... 43/17.1; 43/42.06; 43/42.31; 43/42.48
[51] Int. Cl.² ......................................... A01K 85/00
[58] Field of Search ............... 43/42.31, 17.1, 42.06, 43/42.45, 42.48

[56] References Cited
UNITED STATES PATENTS
| | | | |
|---|---|---|---|
| 1,812,235 | 6/1931 | Carr | 43/42.06 |
| 2,965,997 | 12/1960 | Leonard | 43/42.48 |
| 3,044,207 | 7/1962 | Dorsett | 43/42.31 |

*Primary Examiner*—Louis G. Mancene
*Assistant Examiner*—Daniel J. Leach
*Attorney, Agent, or Firm*—Dana E. Keech

[57] ABSTRACT

A body cast in the form of a bait fish and having a passageway formed therein and co-extensive with said body for transmitting a stream of water lengthwise through the lure from the front end to the rear end thereof as the lure is trolled in the water, thereby setting up a sonar signal exciting fish to attack the lure, said body having hook means trailing therefrom and means for trolling the lure on a fishing line. The lure has a bead trapped in the passageway so as to be agitated by water flowing therethrough to produce a rattling noise which further attracts fish to the lure.

2 Claims, 5 Drawing Figures

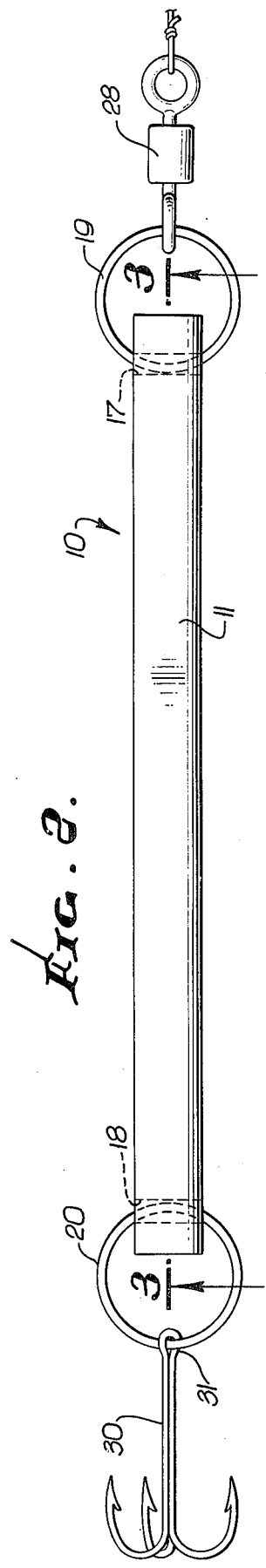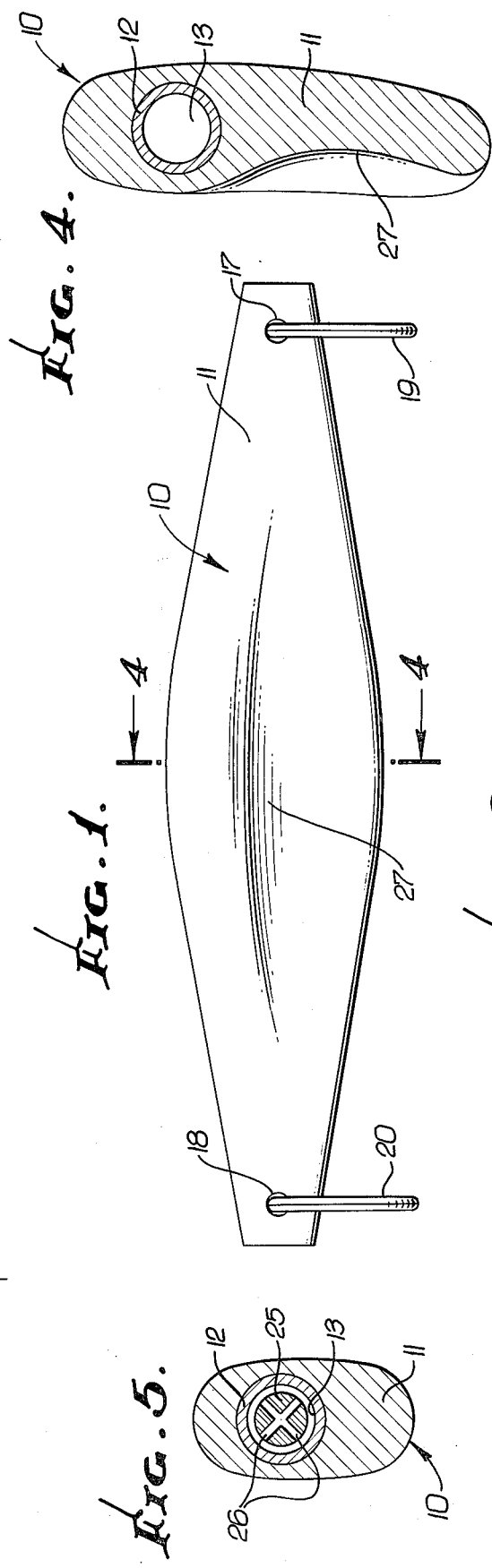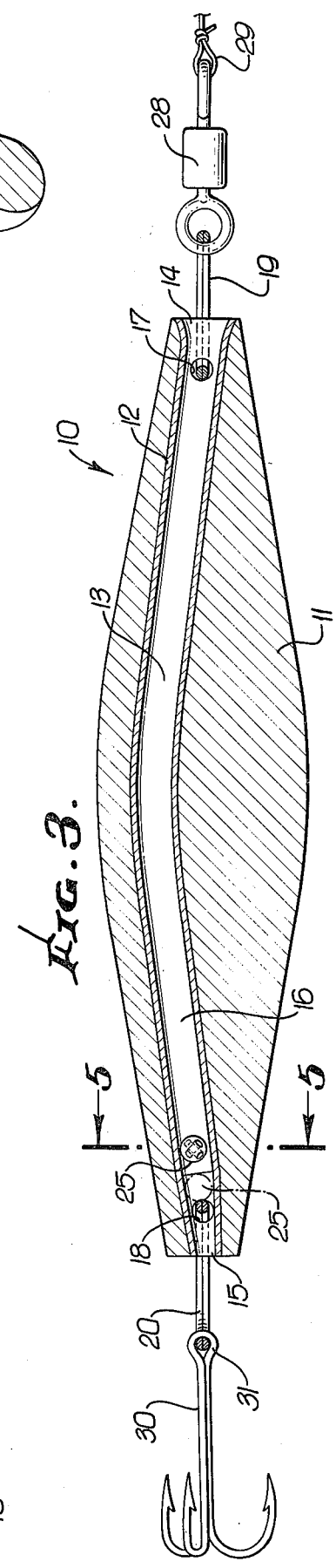

3,905,147

FISHING LURE

SUMMARY OF THE INVENTION

It is a prime object of the present invention to provide a fishing lure which will produce a sonic action which will be picked up by nearby fish and which will excite the fish to strike the lure.

Another object is to provide such a fishing lure which will be so shaped as to produce a rhythmic weaving of the body of the lure in its path through the water, thereby simulating a bait fish.

A still further object of the invention is to provide such a fishing lure as will have embodied therein a passage co-extensive with the body of the lure and formed lengthwise therein so as to conduct water through said body and discharge the same at the rear end of the lure in a manner to set up a sonic action which will excite nearby fish to strike said lure.

Still another object of the invention is to provide such a fishing lure having a bead trapped in said passage so as to be agitated by water flowing through said passage producing a rattling noise which attracts fish to the lure.

A yet further object of the invention is to provide a lure with a flat body with a hollow formed in one side to produce a wobbling motion in the lure as it is trolled at the end of a line.

BRIEF DESCRIPTION OF THE DRAWINGS

FIG. 1 is a side elevational view of the body of a preferred embodiment of the fishing lure of the invention with the split ring attaching means provided at its opposite ends hanging vertically therefrom prior to connecting said rings to a hook means and to a trolling line.

FIG. 2 is a plan view of the fishing lure shown in FIG. 1 with one of said attaching rings connected to a three prong hook at the trailing end of the lure and with the other of said attaching rings being connected to a trolling line swivel at the leading end of the lure.

FIG. 3 is a vertical sectional view taken on the line 3—3 of FIG. 2.

FIG. 4 is an enlarged cross sectional view taken on the line 4—4 of FIG. 1, and illustrating the hollow provided in one side of the body of the invention thereby contributing substantially to said lure following an erratic path through the water.

FIG. 5 is an enlarged transverse sectional view taken on the line 5—5 of FIG. 3 and illustrates the structure of the bead preferably embodied in the fishing lure of the invention and trapped in the lengthwise passage of said lure to cause said bead to be agitated by water flowing through said passage and thus producing a rattling noise which attracts fish to the lure.

DETAILED DESCRIPTION OF THE PREFERRED EMBODIMENT

The fishing lure 10 of the invention preferably includes a streamlined body 11 which may be cast of a suitable plastic or metal material to embed therein a copper tube 12 providing a passage 13 which is co-extensive in length with the body 11 so as to have a leading outwardly belled front end 14 and a constrictingly tapered rear end 15. The tube 12 is bent before being embedded in the lure body 11 when the latter is cast, so that a rear portion 16 of said pipe is angularly related with the fore and aft axis of the lure 10.

A pair of holes 17 and 18 are formed transversely in the body 11 near the leading and trailing ends of said body respectively, said holes being centered on the longitudinal axis of said body and extending through said tube 12 and being occupied loosely by a pair of split rings 19 and 20. Trapped in the passage 13 between the rings 19 and 20 is a bead 25 which is preferably made of a hard metal such as stainless steel and said bead preferably has at least two diametral holes 26 which facilitate vibration of the bead 25 in a position just forward of split ring 20 as shown in FIG. 3, by the travel of a stream of water through the passageway 13 as will be more fully pointed out hereinafter.

The lure body 11 is relatively flat as shown in FIG. 4 and has formed in one side face thereof a hollow 27 the purpose of which will be explained hereinafter.

The split ring 19 is employed for securing to the leading end of lure body 11 a swivel 28 to which a fishing string 29 may be tied when trolling with the lure 10.

Split ring 20 is provided for securing to the trailing end of the lure 10 any kind of a hook device such as a triple hook cluster 30 having an eye 31 through which the ring 20 is inserted.

OPERATION

When trolling with the lure 10 tied to the end of a line 29, the swivel 28 may be weighted to assure the travel of the lure 10 at the proper depth in the water for its coming to the attention of the particular type of fish being hunted. By virtue of its construction, as above described, the lure 10, in being drawn through the water, sets up a stream of water entering the belled front end 14 of the passage 13 and being emitted through the constricted rear end 15 of said passage in a jet of restricted cross section and increased speed thereby setting up a sonar disturbance in the water having a relatively high pitch so as to reach fish in the neighborhood of the lure 10 causing them to dash at and strike the lure.

The sonar excitement above described is supplemented in the lure 10 by the rattling of the bead 25 against the split ring 20 and the inner surface of the copper tube 12 which results from the stream of water flowing past said bead through said passage.

The sharp metallic impact of the bead 25 with the split ring 20 contributes to the sonar excitement produced by the lure 10, an element greatly enhancing the effectiveness of the lure as a whole.

The angled character of the rear terminal portion 16 of the passage 13 and the hollow 27 provided on one side of the lure body 11 each contributes in its own way to the rhythmic wobbling of the lure 10 in its path through the water in a pattern resembling that with which a bait fish travels through the water. The rhythmic wobbling of the lure 10 due to these elements adds to the general streamlined appearance of the lure so as to render the lure increasingly attractive to the game fish being hunted.

I claim:
1. A fish lure comprising:
    a flattened body streamlined to resemble the body of a bait fish;
    there being a passage formed lengthwise in said body and co-terminal therewith;
    means for attaching a trolling line to the leading end portion of said body;

means for attaching a hook means to the trailing end portion of said body, a jet of water being emitted from the trailing end of said passage to produce a sonic action which excites the fish to strike said lure, lengthwise spaced restrictions being provided in said passage without shutting off the flow of water through said passage; and a bead trapped in said passage between said restrictions, causing said bead to be agitated by water flowing through said passage thereby producing a rattling noise which attracts fish to the lure.

2. A fish lure as recited in claim 1 wherein said bead is provided with at least two diametral intersecting orifices to enhance the agitation of the bead by the water flowing through said passage.

* * * * *